Dec. 26, 1967  G. JEAN-LOUIS RANVIER ET AL  3,360,074
JET ENGINE SILENCERS WITH PIVOTAL AIR INDUCTION TUBES
Filed June 3, 1965
2 Sheets-Sheet 1
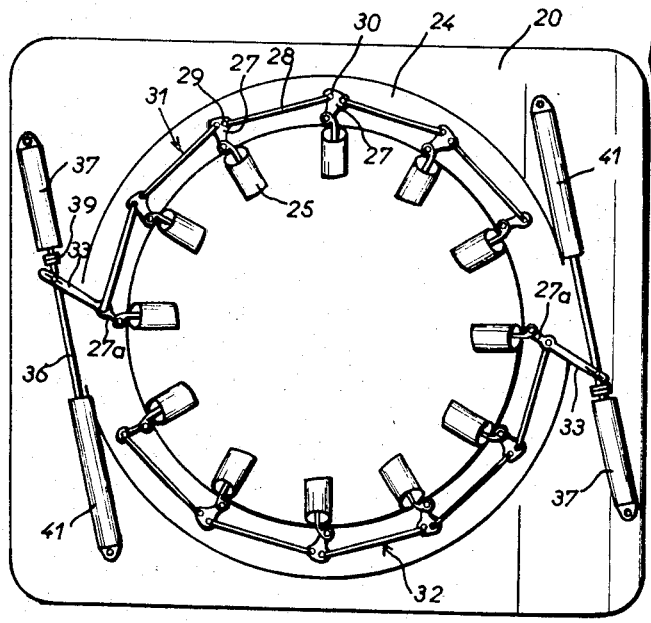
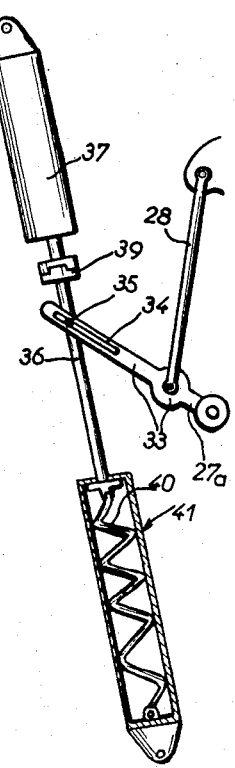
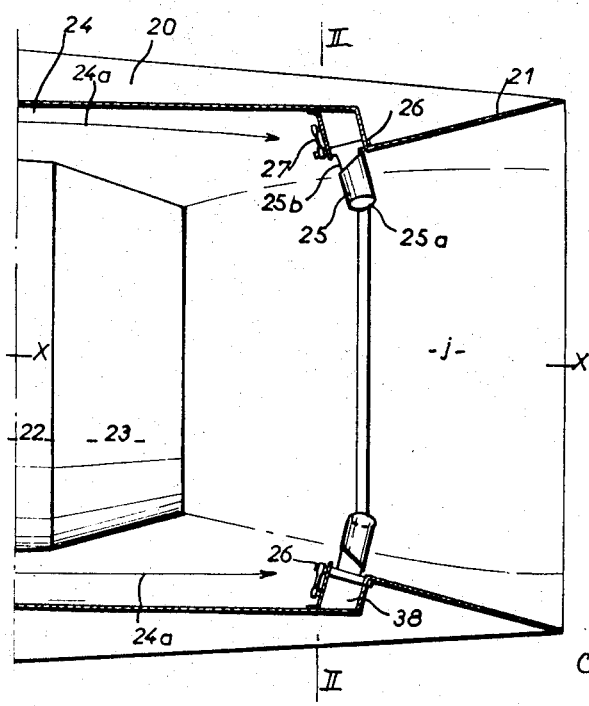
Inventors
Gaston J.-L. Ranvier
Gerhard Richter
Stevens, Davis, Miller & Mosher
Attorneys

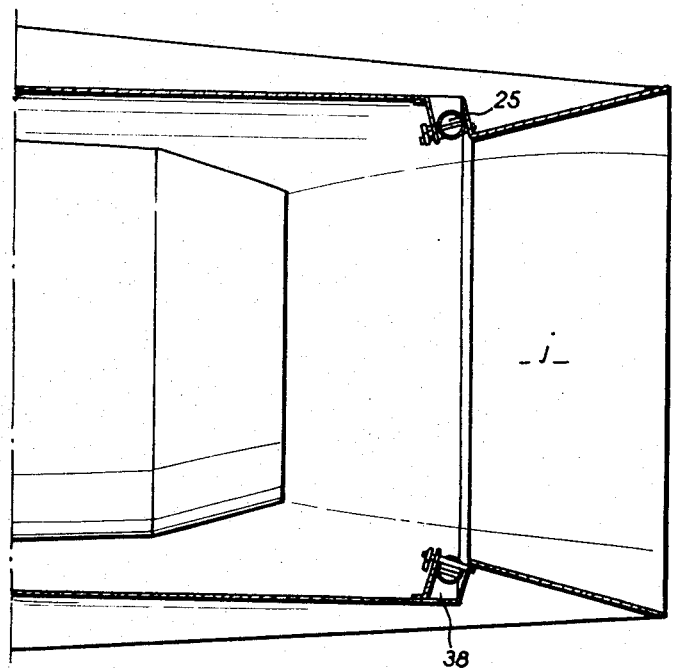
Fig.:1a
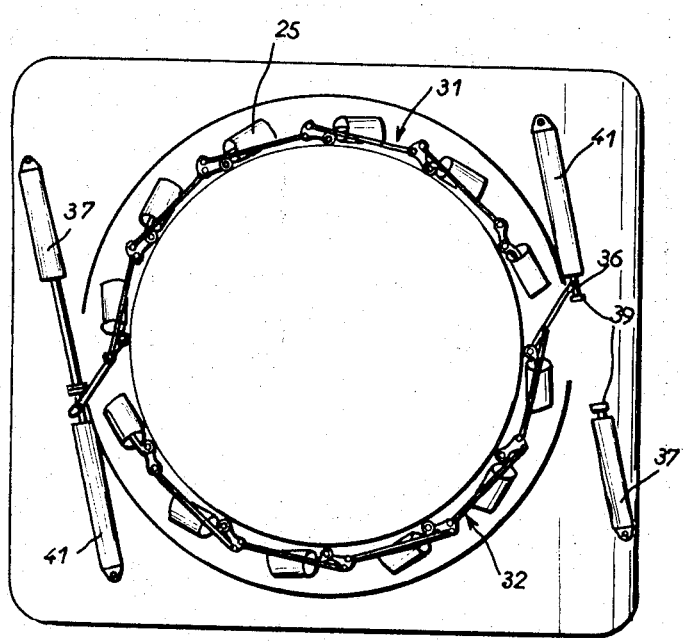
Fig.:2a
Inventors
Gaston J.-L. Ranvier
Gerhard Richter
Stevens, Davis, Miller & Mosher
Attorneys United States Patent Office 3,360,074
Patented Dec. 26, 1967

3,360,074
JET ENGINE SILENCERS WITH PIVOTAL
AIR INDUCTION TUBES
Gaston Jean-Louis Ranvier, Issy-les-Moulineaux, and Gerhard Richter, Dammarie-les-Lys, France, assignors to Societe Nationale d'Etude et de Construction de Moteurs d'Aviation, Paris, France, a company of France
Filed June 3, 1965, Ser. No. 461,037
Claims priority, application France, June 8, 1964, 977,483
5 Claims. (Cl. 181—51)

ABSTRACT OF THE DISCLOSURE

A retractable noise suppressor device for a jet engine with a convergent nozzle, which is arranged in a nacelle or like structure having a divergent portion mechanically independent of the engine nozzle. The device comprises a plurality of silencer elements, of tubular shape, pivoted on the nacelle or like structure to be retractable to an operative position wherein they project into the hot stream issuing from the nozzle and an inoperative position wherein they are withdrawn into the nacelle or like structure.

The invention relates to devices known as "silencers" which enable the noise of aircraft jet engines and more particularly that of supersonic jet aircraft to be reduced by introducing air into the jet at the rear of the nozzle.

Patent 3,263,931, issued Aug. 2, 1966, to Joseph Bartek et al. describes a device in which the silencer effect is obtained by means of tubes of circular or profiled cross-section, the upstream ends of which have ports adjacent the external periphery of the nozzle and are subjected to the ambient pressure in the vicinity of this periphery, and the downstream ends of which open into the jet to the rear of the nozzle and externally thereof, means being provided for retracting the said tubes at will in order to reduce or clear the space occupied by them in the nozzle and/or in the jet.

The present invention relates to an improvement to the silencer device described in the above-cited patent, as applied to a jet ejection device comprising a divergent portion incorporated in an airframe or of a jet engine nacelle and which consequently can, in the vicinity of the silencer, be absolutely independent mechanically of the jet engine strictly speaking and more particularly the jet pipe and nozzle thereof.

According to the present invention the silencer elements, which are constituted by tubes of circular, oval or profiled cross-section, are articulated to the divergent portion or to the structure which supports it in such manner that they can rock between their operative positions and their inoperative positions, the upstream portion of each said element which emerges from the hot jet in the operative position being skew shaped, so as to ensure good conditions of suction for fresh air coming from a supply outside the nozzle. This external supply may be constituted by, for example, secondary air surrounding the nozzle and flowing through the nacelle or by tertiary air coming from outside. In the inoperative position, the silencer elements are wholly retracted outside the hot jet and are turned back into the structure of the divergent portion or in front of the latter.

In a modification of this embodiment, the tube elements are articulated to the structure of the divergent portion on axes the general direction of which is longitudinal with respect to the nozzle and the rocking thereof is controlled by one or more rod coupling systems each actuated by a jack or other positive control device, means being provided for returning the tubes to the retracted position in the event of failure of the control.

Further objects and features of the invention will become clearly apparent from the description which follows of several possible forms of embodiment of the invention, given with reference to the accompanying non-limitative exemplary drawings.

In the drawings,

FIGURE 1 shows a retractable silencer arranged between a jet engine and a divergent element independent of the said jet engine, the arrangement being shown in diagrammatic axial section and the silencer being in the operative position;

FIGURE 2 is a sectional view on the line II—II of FIGURE 1;

FIGURES 1a and 2a are views similar to FIGURES 1 and 2, respectively, showing the silencer in the inoperative position and FIGURE 3 is a partial view of FIGURE 2 showing the retraction control for the silencer on a larger scale.

In the embodiment which is shown in FIGURES 1 and 2, the structure 20 supporting the divergent element 21 is a jet engine nacelle absolutely independent mechanically of the after end of a jet engine proper, the jet pipe 22 and nozzle 23 of which are shown, this nacelle being, for example, incorporated in the fuselage or in a jet engine pod.

The structure 20 defines an annular space 24 around the jet pipe 22 and nozzle 23, through which space secondary air arrives around the jet j. The silencer elements are tube elements 25 which are articulated at 26 to the structure 20 and the upstream ends 25b of which are each cut slant-wise or skew so as to provide good conditions for the suction of fresh air arriving through the annular conduit 24, as represented diagrammatically by the arrows 24a, when the tubes are directed radially, the downstream ends 25a of the tubes being located in the jet j, as will be seen in FIGURES 1 and 2.

The articulation axes 26 are located in planes which pass through the axis X—X of the nozzle and are slightly inclined with respect to the latter axis. The tubes 25 are each fast with a link member 27 and the links are coupled to one another by rods 28 each of which is articulated at its ends at 29 and 30 to two adjacent links 27, so as to form two kinematic connections 31 and 32 each surrounding the jet j over about one half of its periphery. The link 27a of the tube element 25 located at one of the ends of each of these kinematic connections is integral with a control lever 33 having a slot 34 (FIGURE 3) in which slides a stud 35 fast with a rod 36 sliding under the action of a double-acting jack 37.

The jacks 37 enable the kinematic connections 31 and 32 to be actuated in such manner as to cause each of the tubes 25 to pivot between the operative position shown in FIGURES 1 and 2 and the inoperative position shown in FIGURES 1a and 2a. In this arrangement, the tubes are fully retracted into an annular recess 38 in the structure 20, in the wall of which they are articulated at 26.

So as to ensure the return of the device to the inoperative position shown in FIGURES 1a and 2a, even in the event of failure of the jacks 37 or of their control system, there is provided for each rod 36 a return device 41 and disengaging means shown diagrammatically at 39, the latter being remote-controlled by the pilot and enabling the rod to be disconnected from the jack 37 actuating it. As shown diagrammatically in FIGURE 3, the device 41 may comprise, for example, a spring 40 which returns the rod 36 to the position shown in FIGURE 2a. As regards the disengaging device 39, this may be of any known type and it is unnecessary to show it in detail or to describe it further. In FIGURE 2a, the control device of the kinematic connection 32 is shown with the rod 36 disconnected from the jack 37 by means of the disengaging means 39, being thus restored by the device 41 to the position in which the tubes 25 are restricted.

The operation of the silencer device in the operative position, when the downstream ends of the tubes open into the jet, as shown in FIGURES 1 and 2, is the same as in the above-cited patent, the air being drawn in by induction at the upstream skew ends of the tubes and discharged into the jet at their downstream ends.

What is claimed is:

1. In combination with a jet propulsion engine ending rearwardly with a convergent, hot gas flow discharge nozzle, and with a nacelle housing said engine in spaced relationship to define therewith a cool air flow passage and having a divergent section which extends rearwardly of said nozzle to bound outwardly said cool air flow and the rearward portion of said nacelle being freely supported spaced from said nozzle, a retractable noise suppressing device comprising a plurality of open-ended tubular silencer elements spaced rearwardly from said engine nozzle and pivotably fitted on said nacelle section to be rockable thereon into an operative position wherein said elements project into the hot gas flow discharged by said nozzle with an inner end of said elements being positioned into said hot gas flow and with an outer end thereof being immersed into said cool air flow adjacent said nacelle section, and into an inoperative position wherein said elements are retracted into said nacelle away from said hot gas flow, and controllable means operatively connected with said silencer elements for simultaneously rocking the same selectively into both of said positions thereof.

2. The combination of claim 1, wherein said outer end of said silencer elements is skew so as to face upstream of said cool air flow in scooping relation therewith when said elements are rocked into said operative position thereof.

3. The combination of claim 1, wherein said silencer elements are pivotable about axes extending substantially in axial planes of said engine nozzle.

4. The combination of claim 3, wherein said pivoting axes substantially intersect the nozzle axis.

5. The combination of claim 1, wherein said controllable means comprise a mechanical linking system interconnecting a number of silencer elements, actuator means for positively controlling said linking system, means for selectively disconnecting said linking system from said actuator means, and return means for urging said linking system toward said inoperative position of said silencer elements.

References Cited

UNITED STATES PATENTS

| | | | |
|---|---|---|---|
| 2,982,092 | 5/1961 | Keen | 181—33 |
| 2,997,845 | 8/1961 | Oulianoff | 181—33 |
| 3,027,714 | 4/1962 | Parker | 181—33 |
| 3,263,931 | 8/1966 | Bartek et al. | 181—33 |

ROBERT S. WARD, JR., *Primary Examiner.*